United States Patent
Cho et al.

(10) Patent No.: US 10,373,591 B2
(45) Date of Patent: Aug. 6, 2019

(54) DISPLAY DEVICE

(71) Applicant: SAMSUNG DISPLAY CO., LTD., Yongin-si, Gyeonggi-do (KR)

(72) Inventors: Sungyeon Cho, Hwaseong-si (KR); Taejin Kim, Hwaseong-si (KR); Hui Nam, Yongin-si (KR); Myungho Lee, Anyang-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 149 days.

(21) Appl. No.: 15/207,522

(22) Filed: Jul. 12, 2016

(65) Prior Publication Data
US 2017/0140737 A1    May 18, 2017

(30) Foreign Application Priority Data
Nov. 18, 2015 (KR) .......................... 10-2015-0162064

(51) Int. Cl.
| | | |
|---|---|---|
| *G09G 5/00* | (2006.01) | |
| *G09G 5/37* | (2006.01) | |
| *G06F 1/16* | (2006.01) | |
| *G09G 3/00* | (2006.01) | |

(52) U.S. Cl.
CPC ............ G09G 5/37 (2013.01); G06F 1/1652 (2013.01); G09G 3/001 (2013.01); *G09G 2300/0413* (2013.01); *G09G 2320/029* (2013.01); *G09G 2340/0407* (2013.01); *G09G 2340/0464* (2013.01); *G09G 2340/14* (2013.01); *G09G 2360/144* (2013.01); *G09G 2360/145* (2013.01); *G09G 2380/02* (2013.01)

(58) Field of Classification Search
CPC .. G09G 5/37; G09G 3/001; G09G 2300/0413; G09G 2320/029; G09G 2340/0407; G09G 2340/0464; G09G 2340/14; G09G 2360/144; G09G 2360/145; G09G 2380/02; G06F 1/1652
See application file for complete search history.

(56) References Cited

U.S. PATENT DOCUMENTS

| | | | | |
|---|---|---|---|---|
| 4,139,803 | A * | 2/1979 | Kurahashi | ............. G06F 3/0386 315/169.4 |
| 5,502,514 | A * | 3/1996 | Vogeley | ............... H04N 5/7458 345/175 |
| 2010/0033435 | A1 | 2/2010 | Huitema | |
| 2014/0002430 | A1 * | 1/2014 | Kwack | ................. G09G 3/3225 345/207 |

FOREIGN PATENT DOCUMENTS

| | | |
|---|---|---|
| KR | 10-1383092 B1 | 4/2014 |
| KR | 10-2014-0100149 A | 8/2014 |
| KR | 10-2014-0101611 A | 8/2014 |
| KR | 10-2015-0025415 A | 3/2015 |
| KR | 10-2015-0053650 A | 5/2015 |

* cited by examiner

*Primary Examiner* — Chong Wu
(74) *Attorney, Agent, or Firm* — Lee & Morse, P.C.

(57) ABSTRACT

A display device includes a housing, a flexible display panel, a light receiving sensor, and an area calculator. The flexible display panel is coupled to the housing and displays a reference image and an output image. The flexible display panel has an exposed area with a size that varies with movement of the flexible display panel in a first direction relative to the housing. The sensor senses the reference image and generates sensing data based on the reference image. The area calculator calculates the exposed area of the flexible display panel based on the sensing data.

12 Claims, 16 Drawing Sheets

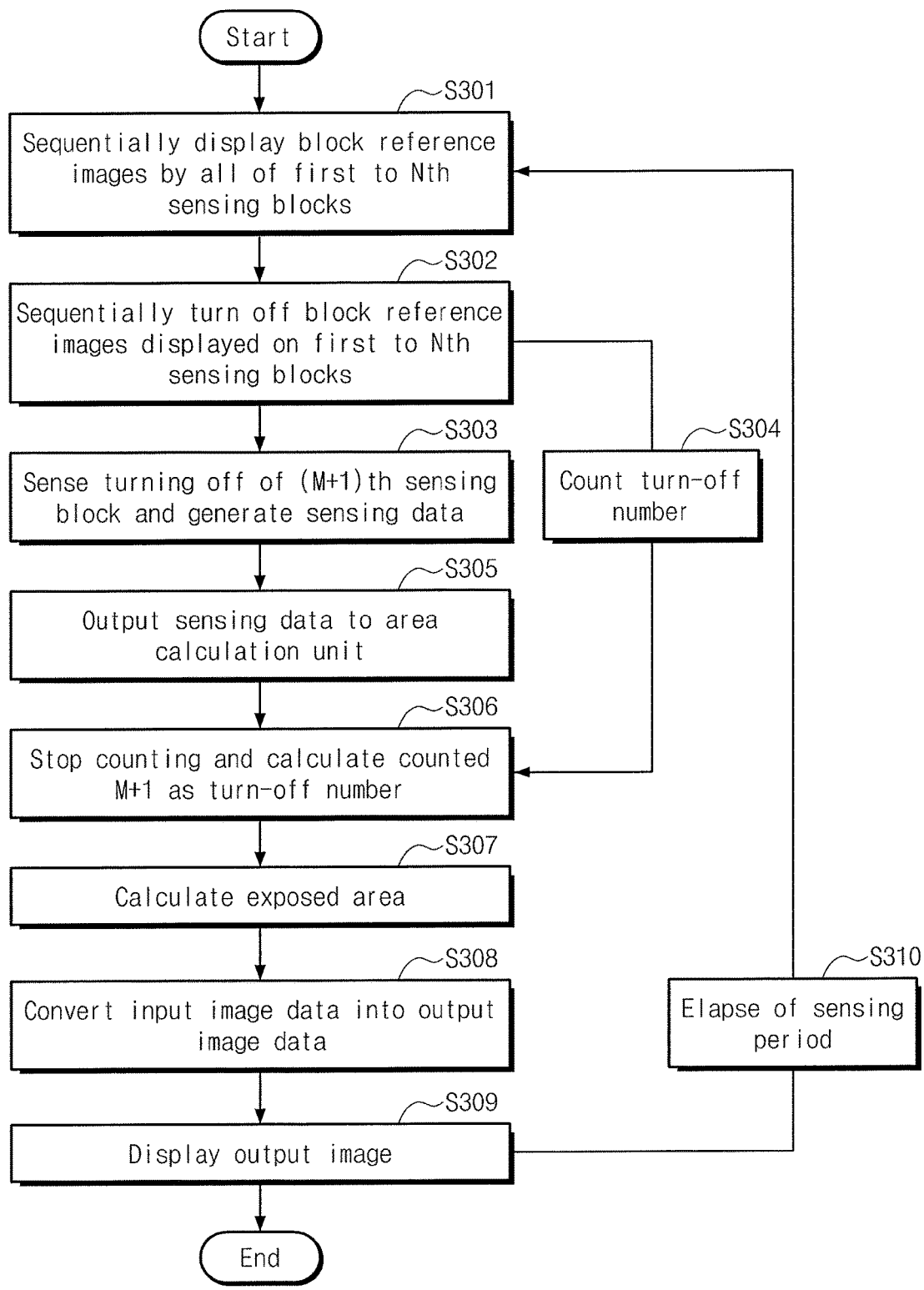

DISPLAY DEVICE

CROSS-REFERENCE TO RELATED APPLICATION

Korean Patent Application No. 10-2015-0162064, filed on Nov. 18, 2015, and entitled: "Display Device," is incorporated by reference herein in its entirety.

BACKGROUND

1. Field

One or more embodiments described herein relate to a display device.

2. Description of the Related Art

One type of display device includes a flexible display panel, which, for example, may be wound in a roll. The panel may be rolled out from the housing when rotated in one direction and rolled into the housing when rotated in an opposite direction. When the panel is rolled in and out, the display area exposed outside of the housing may change.

SUMMARY

In accordance with one or more embodiments, a display device includes a housing; a flexible display panel is coupled to the housing and is to display a reference image and an output image, the flexible display panel having an exposed area with a size that varies with movement of the flexible display panel in a first direction; a light receiving sensor to sense the reference image and to generate sensing data based on the reference image; and an area calculator to calculate the exposed area of the flexible display panel based on the sensing data.

The display device may include a controller to convert input image data to output image data based on the calculated exposed area, wherein the flexible display panel is to display the output image based on the output image data. The flexible display panel may display the output image through an exposed part. The flexible display panel may include a plurality of sensing blocks arranged in the first direction; and a plurality of gate lines extending in a second direction different from the first direction and arranged in the first direction, wherein the reference image is to be displayed through the sensing blocks, each of which corresponds to at least one of the gate lines. Each of the sensing blocks may correspond to a plurality of pixel rows.

The sensing blocks may include first to Nth sensing blocks sequentially arranged in a third direction opposite to the first direction, first to Mth sensing blocks among the first to Nth sensing blocks may be externally exposed from the housing and (M+1)th to Nth sensing blocks among the first to Nth sensing blocks may be in the housing, wherein N≥2 and 2≤M<N and wherein the first to Nth sensing blocks may be sequentially turned off after block reference images are simultaneously displayed by the first to Nth sensing blocks.

The light receiving sensor may be in the housing and faces the (M+1)th sensing block, and the light receiving sensor may sense turning off of the (M+1)th sensing block to generate the sensing data.

The area calculator may count from 1 to M+1 in synchronization with sequential turning off of the block reference images of the first to (M+1)th sensing blocks, stop counting in response to the sensing data and calculate a previously counted number M+1 as a turn-off number, and calculate the exposed area based on the turn-off number.

The sensing data may be output to the area calculator at an output time, and the output time may satisfy t1<t0<t2, where t0 represents the output time, t1 represents a turn-off time of the (M+1)th sensing block, and t2 is a turn-off time of the (M+2)th sensing block. The display panel may display the reference image in every sensing period. The sensing period may correspond to a predetermined number of frames.

The sensing blocks may include first to Nth sensing blocks sequentially arranged in a third direction opposite to the first direction, and the reference image may include block reference images sequentially and respectively displayed by the first to Nth sensing blocks. The flexible display panel may include a first display region to display the reference image and a second display region to display the output image, wherein: the first display region may include a plurality of dummy blocks, the reference image may be displayed through the dummy blocks.

The sensing blocks may include first to Nth dummy blocks sequentially arranged in a third direction opposite to the first direction, the first to Mth dummy blocks among the first to Nth dummy blocks may be externally exposed from the housing, and the (M+1)th to Nth dummy blocks among the first to Nth dummy blocks are in the housing, wherein N≥2 and 2≤M<N and wherein the first to Nth dummy blocks are to be sequentially turned off after block reference images are simultaneously displayed by the first to Nth dummy blocks.

The light receiving sensor may be in the housing and faces the (M+1)th dummy block, and the light receiving sensor may sense turning off of the (M+1)th dummy block to generate the sensing data.

The area calculator may count from 1 to M in synchronization with sequential turning off of the block reference images of the first to Mth dummy blocks, stop counting in response to the sensing data and calculate a previously counted number M as a turn-off number, calculate the exposed area based on the turn-off number. The sensing data may be output at an output time, and the output time may satisfy t1<t0<t2, where to represents the output time, t1 represents a turn-off time of the (M+1)th dummy block, and t2 represents a turn-off time of the (M+2)th dummy block.

The first display region may redisplay the reference image immediately after the Nth dummy block is turned off. The first display region and the second display region may simultaneously display the reference image and the output image. The dummy blocks may include first to Nth dummy blocks sequentially arranged in a third direction opposite to the first direction, and the reference image includes block reference images may be sequentially and repeatedly displayed by the first to Nth dummy blocks.

BRIEF DESCRIPTION OF THE DRAWINGS

Features will become apparent to those of skill in the art by describing in detail exemplary embodiments with reference to the attached drawings in which:

FIG. 3A illustrates an embodiment for operating the display device and FIG. 3B illustrates a timing diagram for the display device;

DETAILED DESCRIPTION

Figure 1:
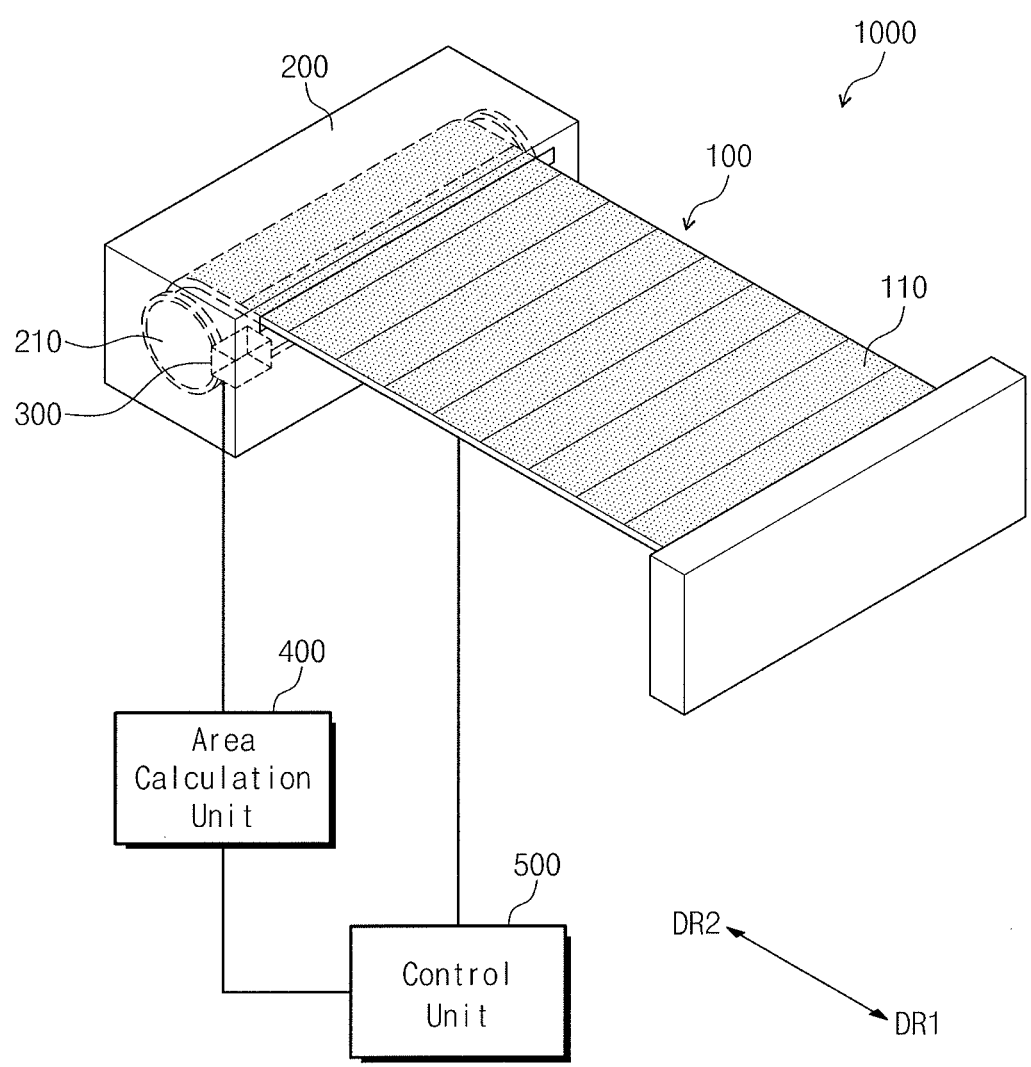
FIG. 1 illustrates an embodiment of a display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a display device 1000 which includes a flexible display panel 100, a housing 200, a panel support 210, a light receiving sensor 300, an area calculation unit 400, and a control unit 500.

The flexible display panel 100 includes a plastic film and may be bent in an arbitrary direction. For example, the flexible display panel 100 may be rolled and may have a predetermined (e.g., rectangular) shape when not in a bent state. When the flexible display panel 100 does not display an image, the flexible display panel 100 may transmit external light to maintain a transparent state.

One end of the flexible display panel 100 may be coupled to the housing 200. The flexible display panel 100 may be variably exposed in a first direction DR1 from the housing 200 and may be retracted into the housing 200 when rolled in an opposing second direction DR2. As the flexible display panel 100 is rolled into and out from the housing 200, an exposed area (e.g., an area corresponding to part of the flexible display panel 100 that is externally exposed) may change.

A reference image and an output image may be displayed on the flexible display panel 100. The output image may be an image visible to a user. The reference image may be an image for calculating the exposed area of the flexible display panel 100 which is not visible to a user.

The flexible display panel 100 includes a plurality of sensing blocks 110 arranged along the first direction DR1.

The panel support 210 may be inside the housing 200. The flexible display panel 100 may be housed by the panel support 210. The panel support 210 may have, for example, a cylindrical shape. The flexible display panel 100 may be rolled by the panel support 210 in order to be housed in the housing 200.

The light receiving sensor 300 may be in the housing 200 and may face one of the sensing blocks 110. The flexible display panel 100 may be housed in the housing 200 or may be variably exposed in the first direction DR1. Accordingly, a sensing block facing the light receiving sensor 300 may be variable. The light receiving sensor 300 may sense light and may generate sensing data on the basis of the reference image.

The area calculation unit 400 has one end connected to the light receiving sensor 300 and another end connected to the control unit 500. The area calculation unit 400 may calculate the exposed area of the flexible display panel 100.

The control unit 500 has one end connected to the area calculation unit 400 and another end connected to the flexible display panel 100. The control unit 500 may convert input image data to output image data on the basis of the exposed area calculated by the area calculation unit 400. The input image data represents data of an image displayed on the flexible display panel 100 before the exposed area is changed, and the output image data represents data of an image displayed on the flexible display panel 100 after the exposed area is changed. The control unit 500 may display the output image on the basis of the output image data obtained through conversion. The output image may be displayed through an exposed part of the flexible display panel 100.

Figure 2:
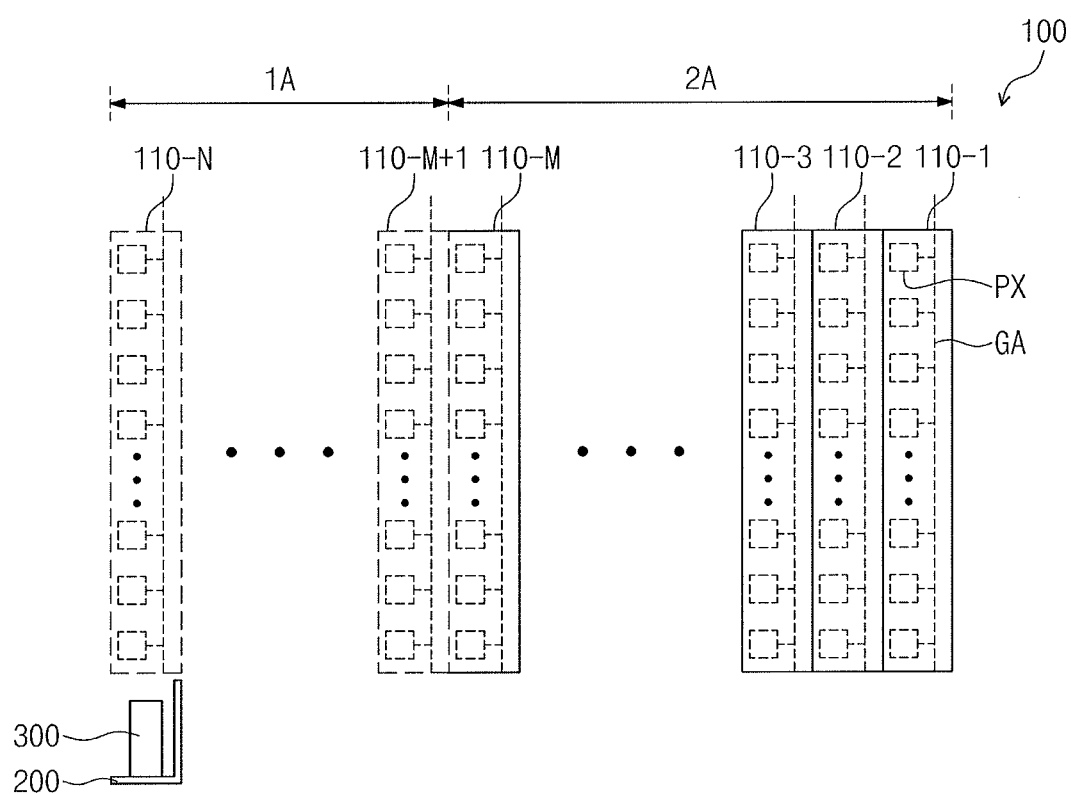
FIG. 2 illustrates a plan view of the display device.

FIG. 2 is a plan view illustrating part of the display device in FIG. 1. Referring to FIG. 2, the flexible display panel 100 may be divided into a housed region 1A and an exposed region 2A. The housed region 1A may be part of the flexible display panel 100 housed in the housing 200. The exposed region 2A may be part of the flexible display panel 100 externally exposed from the housing 200. A plane area of the part of the flexible display panel 100 corresponding to the exposed region 2A may be the exposed area. The parts of the flexible display panel 100 corresponding to the housed region 1A and the exposed region 2A may vary.

In FIG. 2, for convenience, the part of the flexible display panel 100 corresponding to the exposed region 2A is shown as a solid line. The part of the flexible display panel 100 corresponding to the house region 1A is shown as a dotted line.

The flexible display panel 100 may include first to Nth sensing blocks 110-1 to 110-N. First to Mth (M<N) sensing blocks 110-1 to 110-M among the N number of sensing blocks 110-1 to 110-N may be the part of the flexible display panel 100 corresponding to the exposed region 2A. (M+1)th to Nth sensing blocks 110-M+1 to 110-N, other than the M number of sensing blocks 110-1 to 110-M, may be the part of the flexible display panel 100 corresponding to the housed region 1A. The N number of sensing blocks 110-1 to 110-N may be arranged in parallel from a third direction DR3, which is opposite to the first direction DR1.

The reference image may include a plurality of block reference images.

Each of the first to Nth sensing blocks 110-1 to 110-N may display a block reference image. For example, the reference image may represent an image obtained by sequentially displaying the block reference images by the first to Nth sensing blocks 110-1 to 110-N respectively, or may represent an image obtained by displaying the block reference images by the first to Nth sensing blocks 110-1 to 110-N respectively and then sequentially turning off the first to Nth sensing blocks 110-1 to 110-N.

The light receiving sensor 300 may correspond to any one of the sensing blocks 110-M+1 to 110-N that correspond to the housed area 1A. For example, the light receiving sensor 300 may correspond to a sensing block which is closest to the part of the flexible display panel 100 that corresponds to the exposed region 2A, from among the sensing blocks 110-M+1 to 110-N.

As illustrated in FIG. 2, the light receiving sensor 300 may correspond to the (M+1)th sensing block 110-M+1. The light receiving sensor 300 may sense the block reference image displayed by the (M+1)th sensing block 110-M+1.

The flexible display panel 100 may include a plurality of gate lines GA extending in a direction different from the first direction DR1. Each gate line GA may be connected to a plurality of pixels PX. The pixels PX connected to each gate line GA may form a pixel row. For example, each gate line GA may extend in a second direction DR2 perpendicular to the first direction DR1, and the gate lines GA may be arranged along the first direction DR1.

FIG. 3A is a flowchart illustrating one embodiment of an operation of the display device. Referring to FIGS. 2 and 3A, the first to Nth sensing blocks 110-1 to 110-N simultaneously display block reference images (S301). The block reference images may include, for example, white light emitted from the pixels.

Next, the block reference images displayed on the first to Nth sensing blocks 110-1 to 110-N are sequentially turned off (S302). For example, the second sensing block 110-2 may be turned off after the first sensing block 110-1 is turned off, and the third sensing block 110-3 may be turned off after the second sensing block 110-2 is turned off. In one embodiment, the first to Nth sensing blocks 110-1 to 110-N may be turned off at the same interval. The area calculation unit 400 counts from 1 to M+1 in synchronization with sequential turning off of the block reference images of the first to (M+1)th sensing blocks 110-1 to 110-M+1 (S304).

When the (M+1)th sensing block 110-M+1 is turned off, the light receiving sensor 300 is unable to recognize the block reference image of the (M+1)th sensing block 110-M+1 and generates sensing data SD (e.g., see FIG. 3B) (S303).

The light receiving sensor 300 outputs the sensing data SD to the area calculation unit 400 (S305). The sensing data SD may be output to the area calculation unit 400 between a time at which the (M+1)th sensing block 110-M+1 is turned off and a time at which the (M+2)th sensing block 110-M+2 is turned off. For example, the following inequality may be satisfied provided that the sensing data SD is output to the area calculation unit 400 at a time t0, the (M+1)th sensing block 110-M+1 is turned off at a time t1, and the (M+2)th sensing block 110-M+2 is turned off at a time t2.

$$t1 < t0 < t2$$

Satisfaction of the above inequality may prevent the area calculation unit 400 from miscalculating a turn-off number and miscalculating a changed exposed area.

The area calculation unit 400 stops counting in response to the sensing data SD, and calculates a previously counted number M+1 as the turn-off number (S306).

The area calculation unit 400 calculates the exposed area of the flexible display panel 100 on the basis of the turn-off number M+1 (S307). For example, the area calculation unit 400 may calculate the exposed area as an area corresponding to the first to Mth sensing blocks 110-1 to 110-M on the basis of the number M which is smaller than the turn-off number M+1 by 1. The area calculation unit 400 may output the calculated exposed area to the control unit 500.

As described above, the control unit 500 may convert the input image data to the output image data on the basis of the calculated exposed area (S308), and may display a resized output image on the flexible display panel 100 (S309).

The above-mentioned operations S301 to S309 may be repeated upon elapse of a sensing period PT (see, e.g., FIG. 3B) (S310). The sensing period PT may correspond to L number of frames (where L is an arbitrary natural number). For example, L may be 3. In this case, the flexible display panel 100 may display the reference image again when a time corresponding to three frames elapses after the Nth sensing block 110-N displays the block reference image.

Figure 3B:
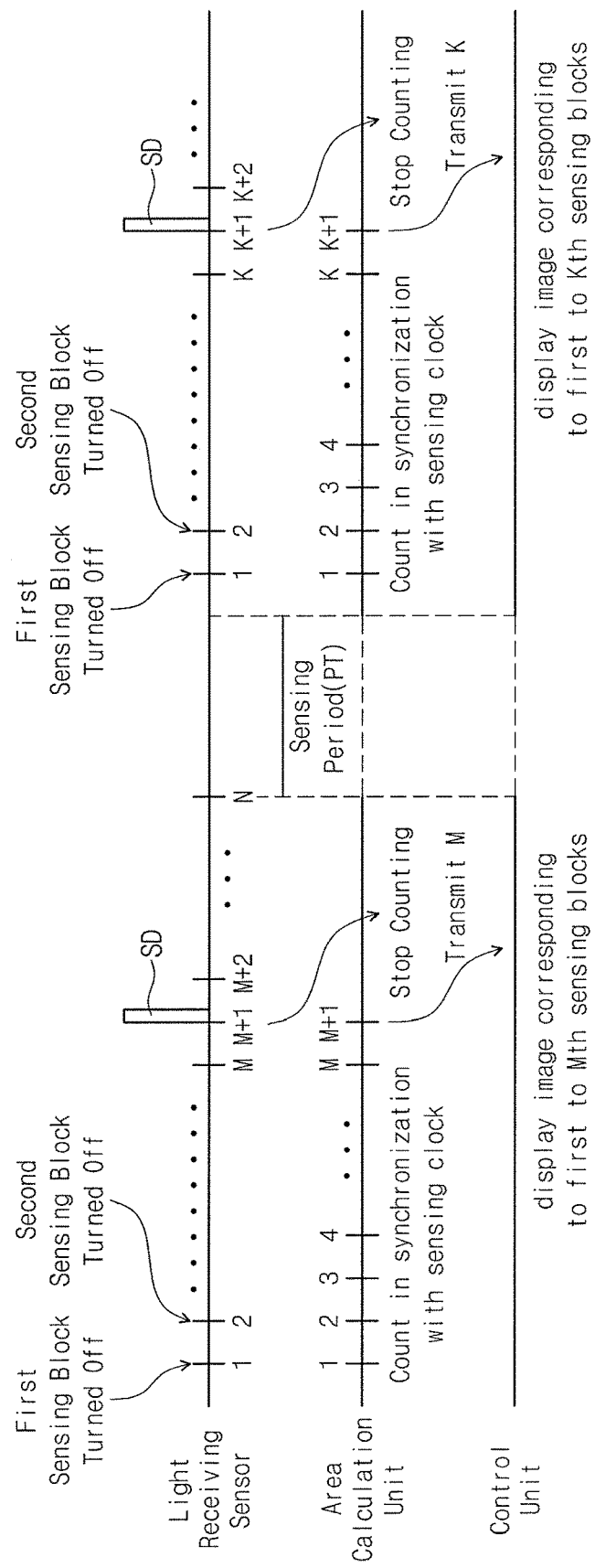

FIG. 3B is embodiment of a timing diagram illustrating operation of the display device. Referring to FIGS. 2, 3A, and 3B, the resized output image is displayed upon completion of operations S301 to S309 of the display device 1000 described in FIG. 3A. Upon elapse of the sensing period PT after the resized output image is displayed (S310), operations S301 to S309 described above with reference to FIG. 3A may be repeated.

In one embodiment, the exposed area may be changed by a user into the area corresponding to the first to Mth sensing blocks 110-1 to 110-M and may be changed again to an area corresponding to the first to Kth sensing blocks 110-1 to 110-K (where K is a number other than M and smaller than N). Upon elapse of the sensing period PT, the area calculation unit 400 may count from 1 to K+1 in synchronization with sequential turning off of the block reference images of the first to (K+1)th sensing blocks 110-1 to 110-K+1, and may stop counting in response to the sensing data SD newly generated by the light receiving sensor 300.

The newly generated sensing data SD may be output to the area calculation unit 400 between a time at which the (K+1)th sensing block 110-K+1 is turned off and a time at which the (K+2)th sensing block 110-K+2 is turned off.

The area calculation unit 400 calculates a previously counted number K+1 as the turn-off number. Furthermore, the area calculation unit 400 calculates the changed exposed area of the flexible display panel 100 on the basis of the turn-off number K+1. For example, the area calculation unit 400 may calculate the changed exposed area as an area corresponding to the first to Kth sensing blocks 110-1 to 110-K on the basis of the number K, which is smaller than the turn-off number K+1 by 1.

As described above, the control unit 500 may convert the input image data to the output image data on the basis of the calculated changed exposed area and may display a resized output image on the flexible display panel 100.

Figure 4A:
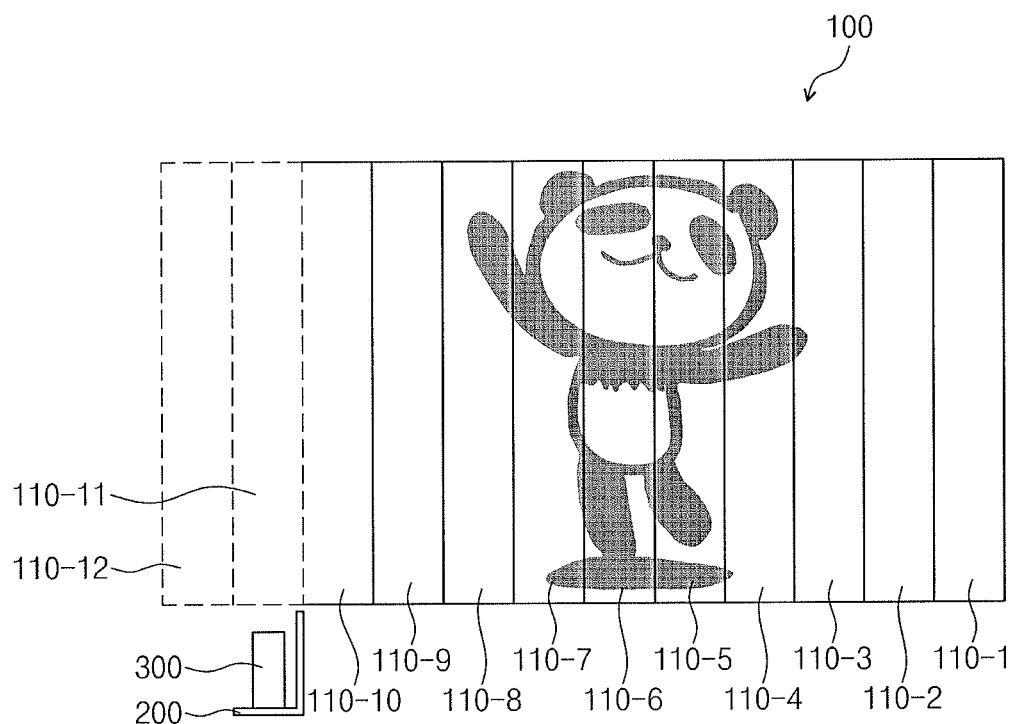
FIG. 4A illustrates an example of an output image of the display device.
Figure 4B:
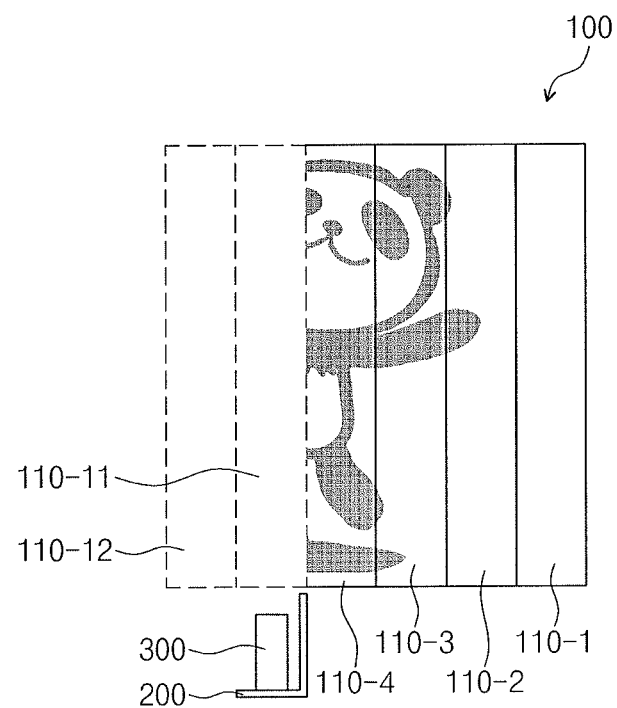
FIG. 4B illustrates an example of the output image after an exposed area of the display device is changed.
Figure 4C:
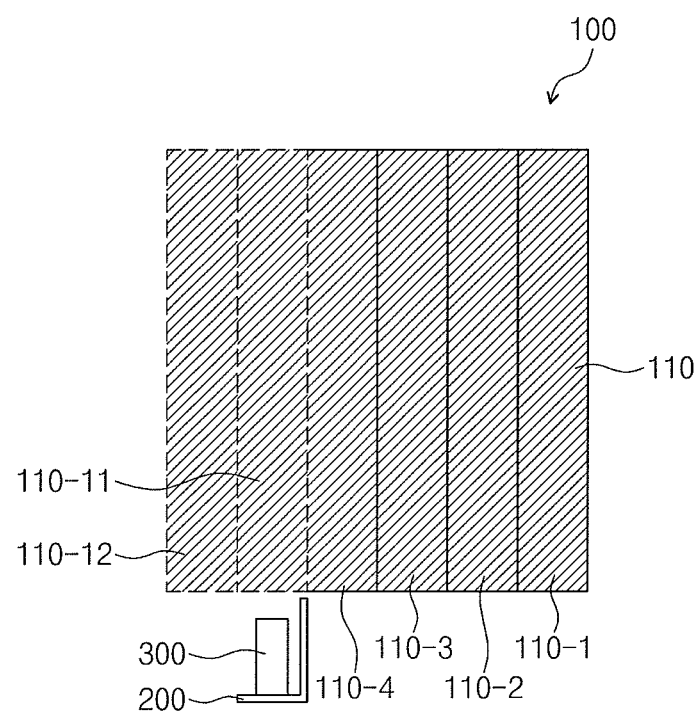
FIG. 4C illustrates an example of a starting phase of a reference image.
Figure 4D:
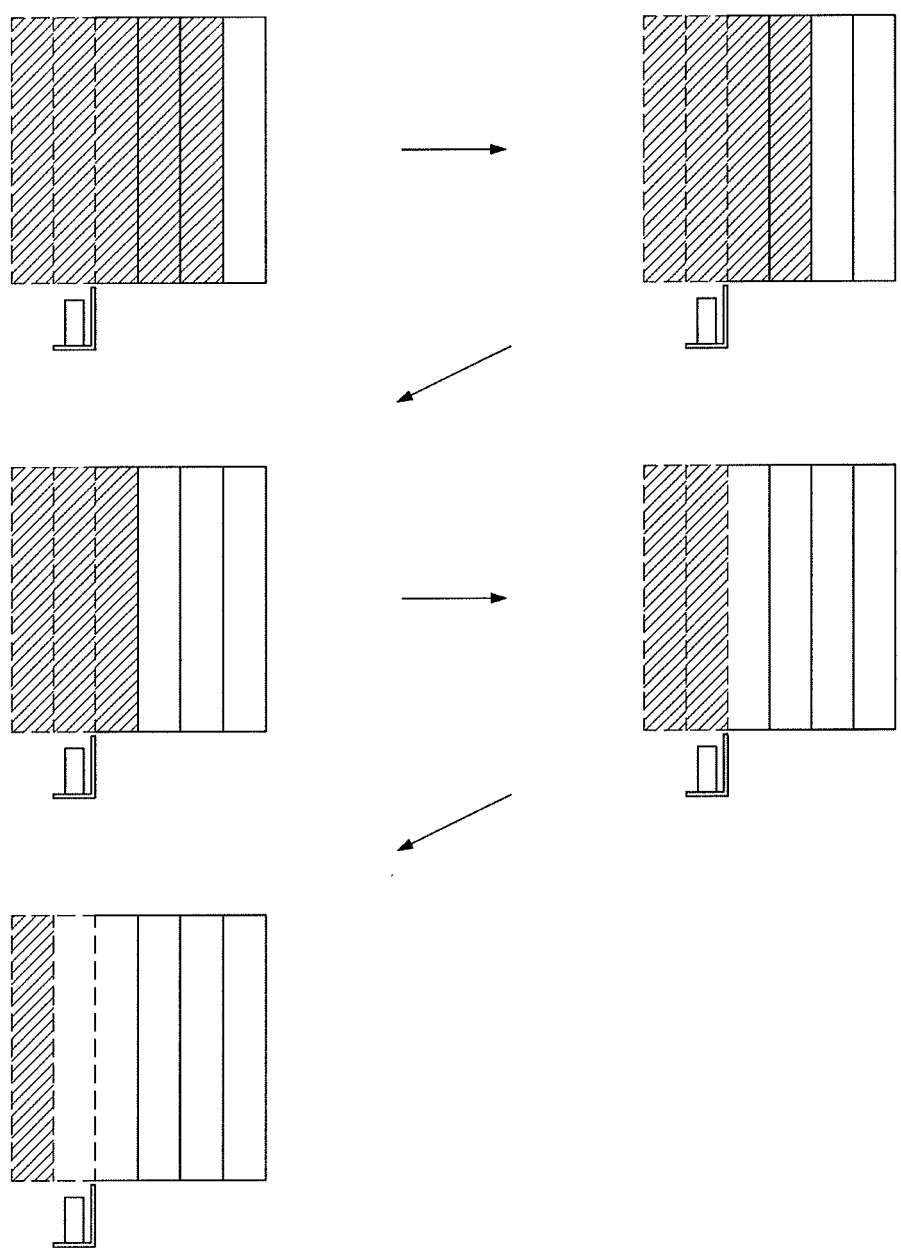
FIG. 4D illustrates an embodiment of a process for displaying a reference image.
Figure 4E:
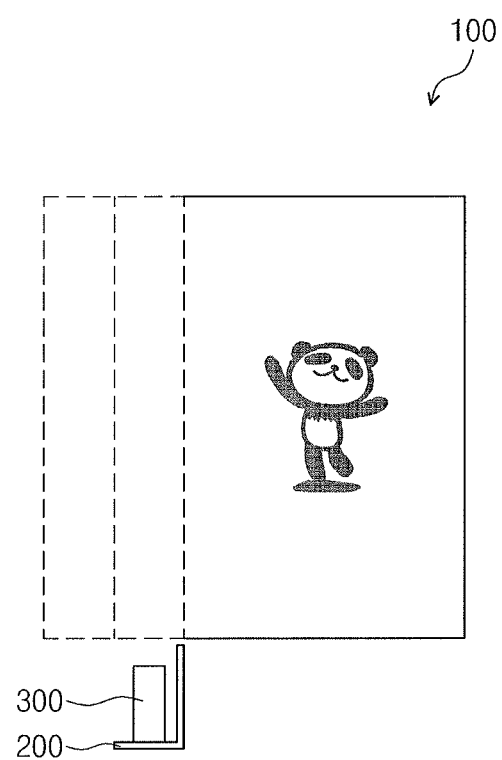
FIG. 4E illustrates an embodiment for changing the size of an output image.

FIG. 4A illustrates an example of an output image of the display device, FIG. 4B illustrates an example of the output image after an exposed area of the display device changes, FIG. 4C illustrates an example of a starting phase of a reference image, FIG. 4D illustrates an embodiment of a process for displaying a reference image, and FIG. 4E illustrates an example of a change in a size of an output image according to the change in the exposed area of the display device 1000. (In the following description, the output image obtained before the exposed area is changed is referred to as a first output image, and the output image obtained after the exposed area is changed is referred to as a second output image).

Referring to FIG. 4A, the first output image may be displayed on the flexible display panel 100. For convenience, it is assumed that the exposed area corresponds to first to 10th sensing blocks 110-1 to 110-10, and 11th and 12th sensing blocks 110-11 and 110-12 are housed in the housing 200. Accordingly, as illustrated in FIG. 4A, the first output image may be displayed on the flexible display panel 100 by the 10 sensing blocks 110-1 to 110-10.

Referring to FIG. 4B, the exposed area of the flexible display panel 100 may be changed by the user using the display device 1000. For example, as illustrated in FIG. 4B, the exposed area of the flexible display panel 100 may be decreased by the user to an area corresponding to the first to fourth sensing blocks 110-1 to 110-4. The fifth to 10th sensing blocks 110-5 to 110-10 exposed in FIG. 4A may be housed in the housing 200. When the exposed area is decreased, part of the first output image may not be visible from the outside. Therefore, the first output image is required to be reduced in size in order to be suitable for display in the decrease size of the exposed area.

Referring to FIG. 4C, upon elapse of the sensing period PT after the first output image is displayed on the flexible display panel 100, the flexible display panel 100 displays the reference image. As illustrated in FIG. 4C, the reference image may be output since all the sensing blocks 110-1 to 110-12 display the block reference images on the flexible display panel 100.

Referring to FIGS. 4C and 4D, as described above with reference to FIG. 3, the first to 12th sensing blocks 110-1 to 110-12 may be sequentially turned off at a fixed interval. As the fifth sensing block 110-5 corresponding to the light receiving sensor 300 is turned off, the light receiving sensor 300 may sense turning off of the fifth sensing block 110-5 to generate the sensing data SD.

Thereafter, through the process described above with reference to FIGS. 3A and 3B, the control unit 500 may display the second output image on the flexible display panel 100 according to the changed exposed area as in FIG. 4E. For example, the output image may be displayed on the flexible display panel 100 according to the changed exposed area, by displaying, on the flexible display panel 100, the reference image which is not externally visible in every sensing period PT.

Furthermore, in accordance with this embodiment, the manufacturing process and operation of the display device 1000 may be simplified because the reference image displayed by the flexible display panel 100 is used without an additional display or recognition pattern. Moreover, the display device 1000 is able to adapt to a change in the exposed area using the light receiving sensor 300 alone and may thus enable a reduction in costs compared to a display device that converts an image based on an exposed area.

Figure 5A:
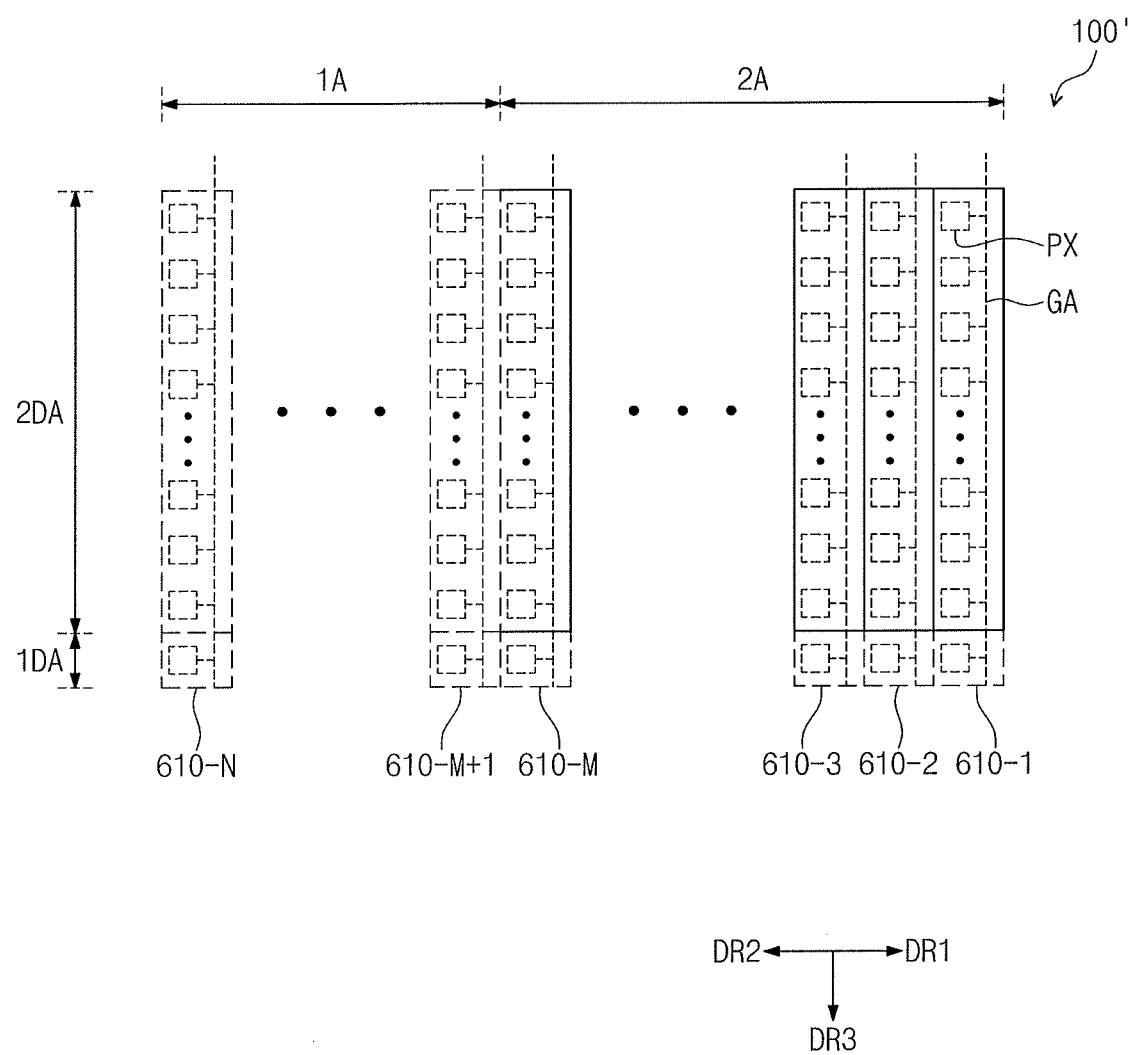
FIG. 5A illustrates a plan view of another embodiment of a display device.
Figure 5B:
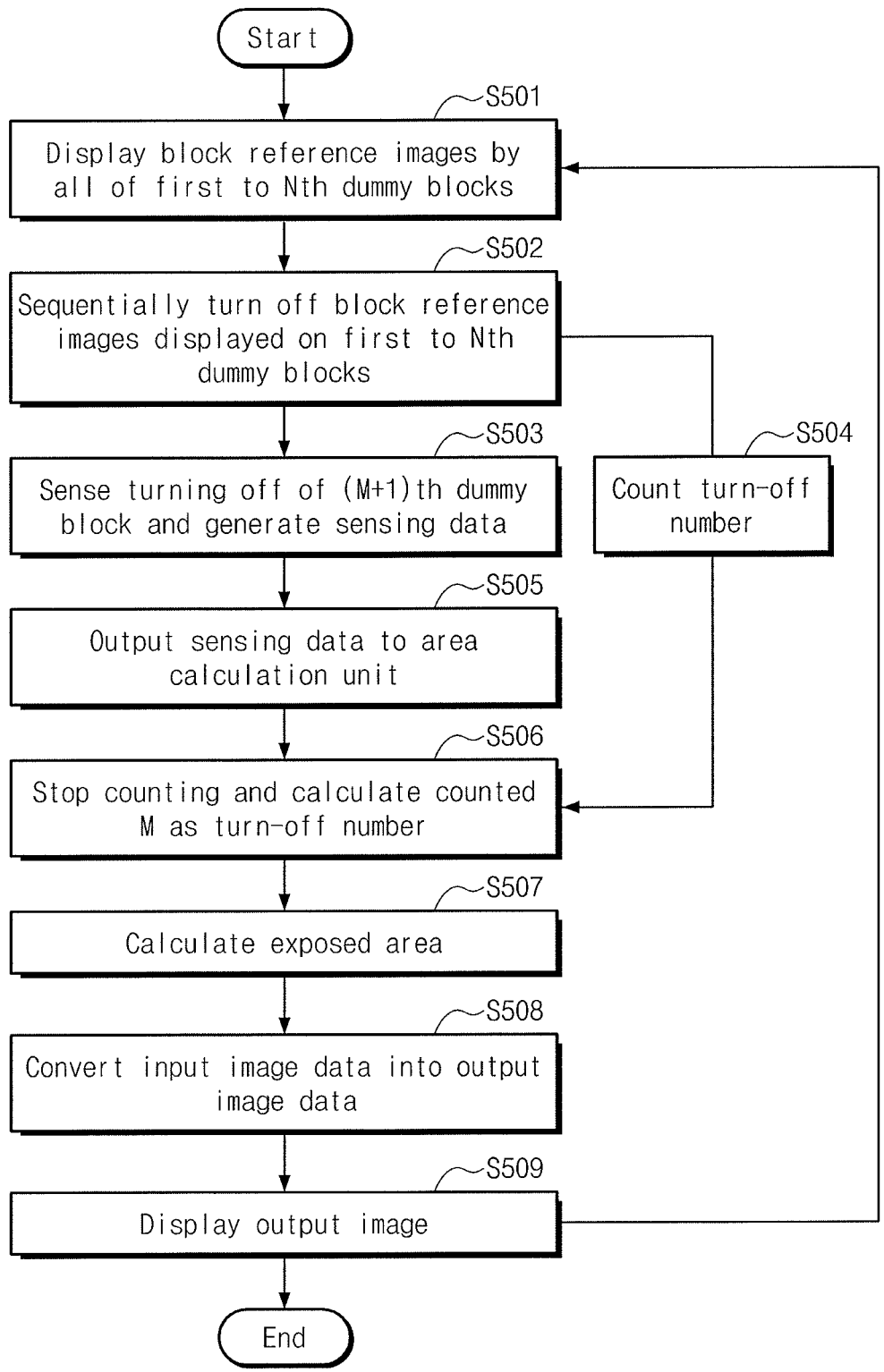
FIG. 5B illustrates an embodiment for operating a display device in FIG. 5A.

FIG. 5A illustrates a plan view of another embodiment of a display device 100' and FIG. 5B illustrates an embodiment for operating a display device. Referring to FIGS. 2 and 5A, flexible display panel 100' includes a plurality of dummy blocks 610-1 to 610-N instead of the sensing blocks in FIG. 2. The flexible display panel 100' may include a first display region 1DA and a second display region 2DA. The second display region 2DA may display the output image. The first display region 1DA may display the reference image. For example, the first display region 1DA may include the dummy blocks 610-1 to 610-N and may display the reference image through the dummy blocks 610-1 to 610-N. The dummy blocks 610-1 to 610-N may be arranged on or under a part of the flexible display panel 100' corresponding to the second display region 2DA.

FIG. 5B is a flowchart illustrating an embodiment for operating the display device in FIG. 5A. Referring to 5B, the first to Nth dummy blocks 610-1 to 610-N simultaneously display block reference images (S501). The block reference images may include white light emitted from the plurality of pixels.

Next, the block reference images displayed on the first to Nth dummy blocks 610-1 to 610-N are sequentially turned off (S502). For example, the second dummy block 610-2 may be turned off after the first dummy block 610-1 is turned off and the third dummy block 610-3 may be turned off after the second dummy block 610-2 is turned off. The first to Nth dummy blocks 610-1 to 610-N may be turned off at the same interval. The area calculation unit 400 counts from 1 to M+1 in synchronization with sequential turning off of the block reference images of the first to (M+1)th dummy blocks 610-1 to 610-M+1 (S504).

When the (M+1)th dummy block 610-M+1 is turned off, the light receiving sensor 300 is unable to recognize the block reference image of the (M+1)th dummy block 610-M+1 and generates the sensing data SD (S503).

The light receiving sensor 300 outputs the sensing data SD to the area calculation unit 400 (S505). The sensing data SD may be output to the area calculation unit 400 between a time at which the (M+1)th dummy block 610-M+1 is turned off and a time at which the (M+2)th dummy block 610-M+2 is turned off. For example, the following inequality may be satisfied provided that the sensing data SD is output to the area calculation unit 400 at a time t0, the (M+1)th dummy block 610-M+1 is turned off at a time t1, and the (M+2)th dummy block 610-M+2 is turned off at a time t2.

$$t1 < t0 < t2$$

Satisfaction of the above inequality may prevent the area calculation unit 400 from miscalculating a turn-off number and miscalculating a changed exposed area.

The area calculation unit 400 stops counting in response to the sensing data SD, and calculates a previously counted number M+1 as the turn-off number (S506).

The area calculation unit 400 calculates the exposed area of the flexible display panel 100' on the basis of the turn-off number M+1 (S507). For example, the area calculation unit 400 may calculate the exposed area as an area corresponding to the first to Mth dummy blocks 610-1 to 610-M on the basis of the number M which is smaller than the turn-off number M+1 by 1.

The area calculation unit 400 may output the calculated exposed area to the control unit 500. As described above, the control unit 500 may convert the input image data to the output image data on the basis of the calculated exposed area (S508) and may display a resized output image on the flexible display panel 100' (S509).

The above-mentioned operations S501 to S509 may be repeated without the sensing period PT described with reference to FIG. 3B. The first display region 1DA may redisplay the reference image immediately after the Nth dummy block 610-N is turned off.

Furthermore, since the flexible display panel 100' includes the first display region 1DA and the second display region 2DA, the flexible display panel 100' may simultaneously display the reference image and the output image. For example the size of the output image may be changed according to the exposed area, which varies in real time, by displaying the output image on the flexible display panel 100' and displaying, at the same time, the reference image, which is not visible, through the first to Nth dummy blocks 610-1 to 610-N.

The display panel 100' of this embodiment may be different from the display device 100 in FIG. 2 which displays the reference image after displaying the output image and displays the output image after displaying the reference image.

Figure 6A:
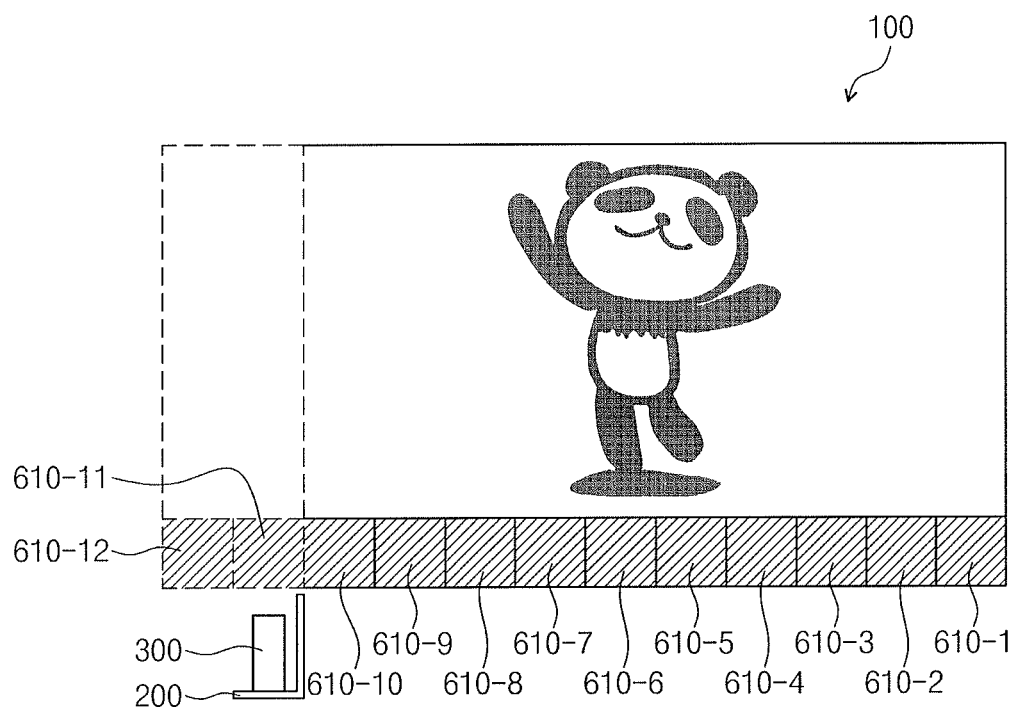
FIG. 6A illustrates an additional embodiment of an output image of a display device.
Figure 6B:
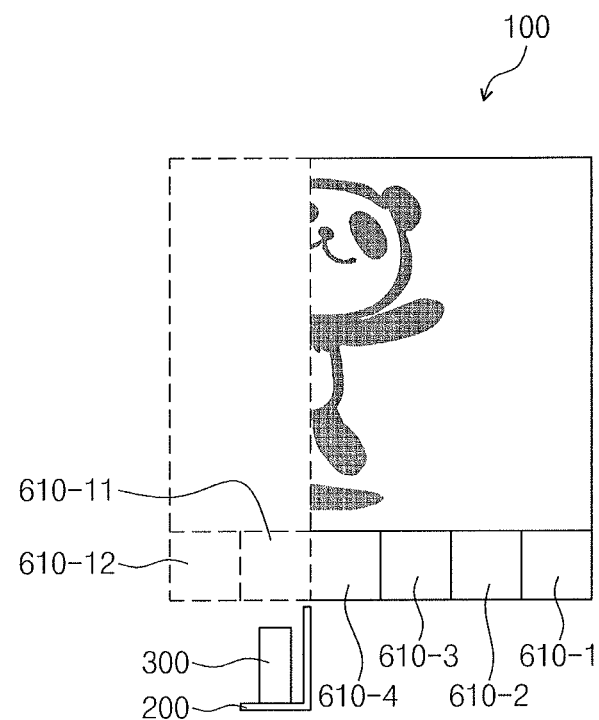
FIG. 6B illustrates an embodiment of the output image after an exposed area of the display device is changed.
Figure 6C:
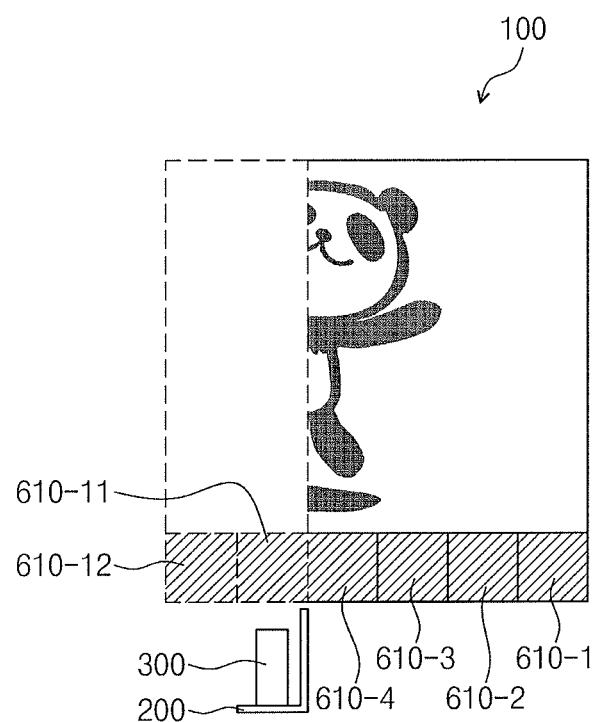
FIG. 6C illustrates an embodiment of a starting phase of a reference image.
Figure 6D:
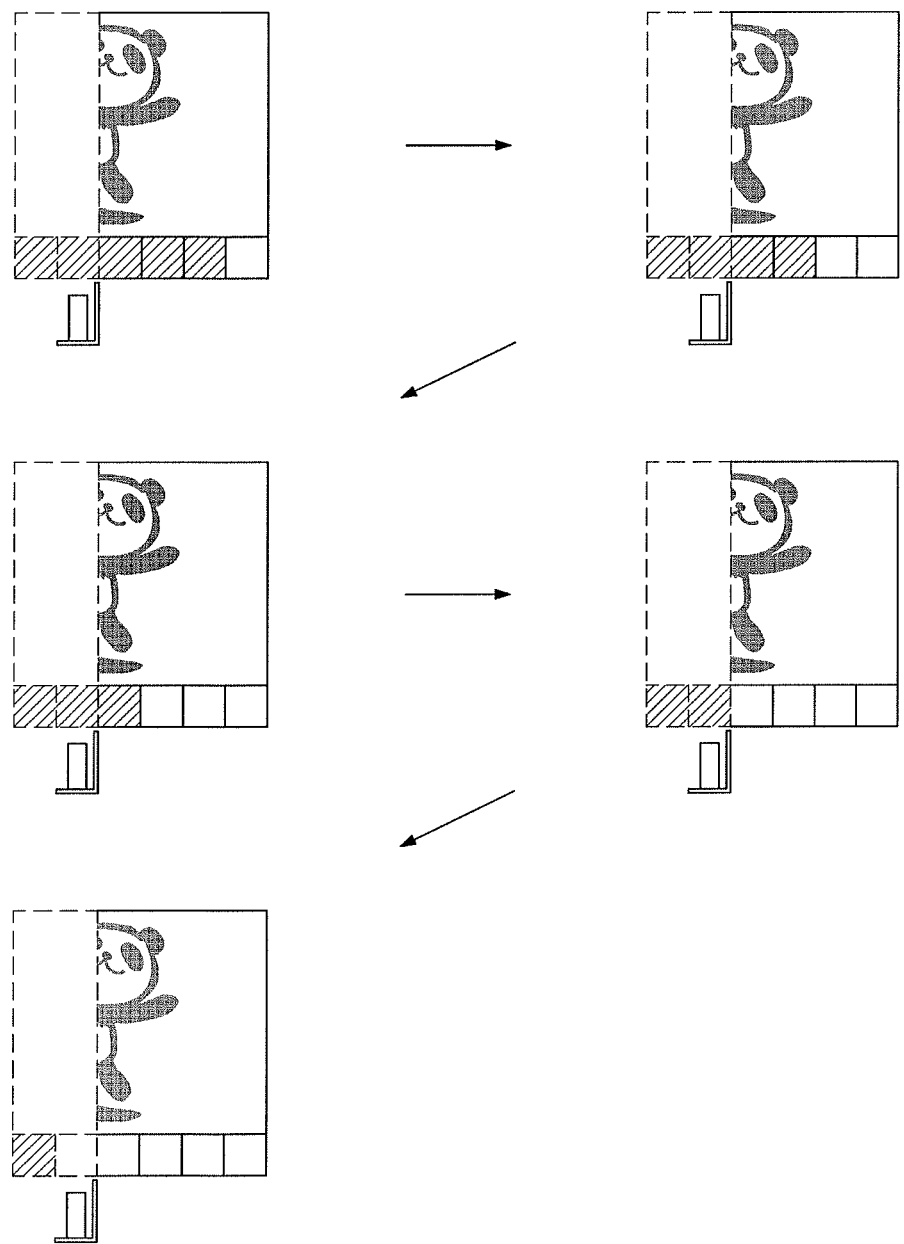
FIG. 6D illustrates an embodiment of a process for displaying a reference image.
Figure 6E:
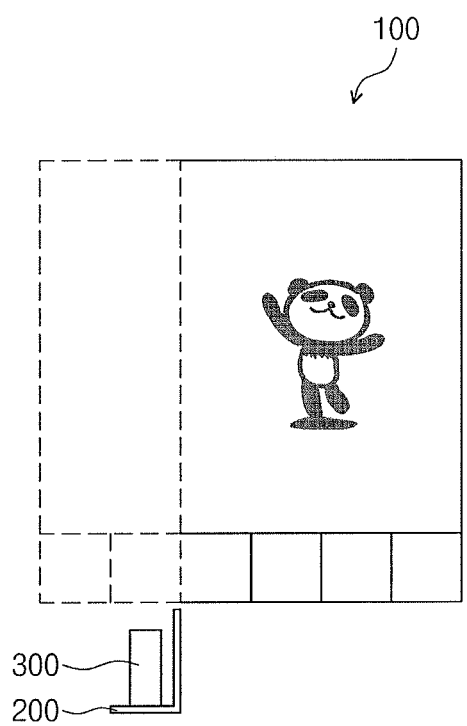
FIG. 6E illustrates an embodiment for changing the size of an output image.

FIG. 6A illustrates an example of an output image of the display device 100', FIG. 6B illustrates an example of the output image after an exposed area of the display device is changed, FIG. 6C illustrates an embodiment of a starting phase of a reference image, FIG. 6D illustrates an embodiment of a process for displaying a reference image, and FIG. 6E illustrates an embodiment for changing the size of an output image. (In the following description, an output image obtained before the exposed area is changed is referred to as a third output image, and an output image obtained after the exposed area is changed is referred to as a fourth output image).

Referring to FIG. 6A, the third output image may be displayed on the flexible display panel 100'. For convenience, it is assumed that the exposed area corresponds to first to 10th dummy blocks 610-1 to 610-10, and 11th and 12th dummy blocks 610-11 and 610-12 are housed in the housing 200. Accordingly, as illustrated in FIG. 6A, the third output image may be displayed on the flexible display panel 100' by the 10 dummy blocks 610-1 to 610-10.

Referring to FIG. 6B, the exposed area of the flexible display panel 100' may be changed by the user using the display device 1000. For example, as illustrated in FIG. 6B, the exposed area of the flexible display panel 100' may be decreased by the user to an area corresponding to the first to fourth dummy blocks 610-1 to 610-4. The fifth to 10th dummy blocks 610-5 to 610-10 exposed in FIG. 6A may be housed in the housing 200. When the exposed area is decreased in size, part of the third output image may not be externally visible. Therefore, the third output image is required to be reduced in size in order to correspond to the decrease in size of the exposed area.

Referring to FIG. 6C, the flexible display panel 100' may display the reference image while displaying the third output image. As illustrated in FIG. 6C, the reference image may be output since all the dummy blocks 610-1 to 610-12 display the block reference images on the flexible display panel 100'.

Referring to FIGS. 6C and 6D, the first to 12th dummy blocks 610-1 to 610-12 may be sequentially turned off at a fixed interval. As the fifth dummy block 610-5 corresponding to the light receiving sensor 300 is turned off, the light receiving sensor 300 may sense turning off of the fifth dummy block 610-5 to generate sensing data SD.

Thereafter, through the process described above with reference to FIG. 5B, the control unit 500 may display the fourth output image on the flexible display panel 100' according to the changed exposed area as illustrated in FIG. 6E.

As described above, the output image may be displayed on the flexible display panel 100' according to the changed exposed area in real time, by repeatedly displaying, on the flexible display panel 100', the reference image which is not visible from the outside without the sensing period PT.

Furthermore, in accordance with the present embodiment, the manufacturing process and operation of the display device 1000 may be simplified since the reference image displayed by the flexible display panel 100' is used without an additional display or recognition pattern. Moreover, the display device 1000 is able to adapt to a change in the exposed area using the light receiving sensor 300 alone and, thus, may allow for a reduction in costs compared to a display device which converts a display image according to an exposed area.

Figure 7:
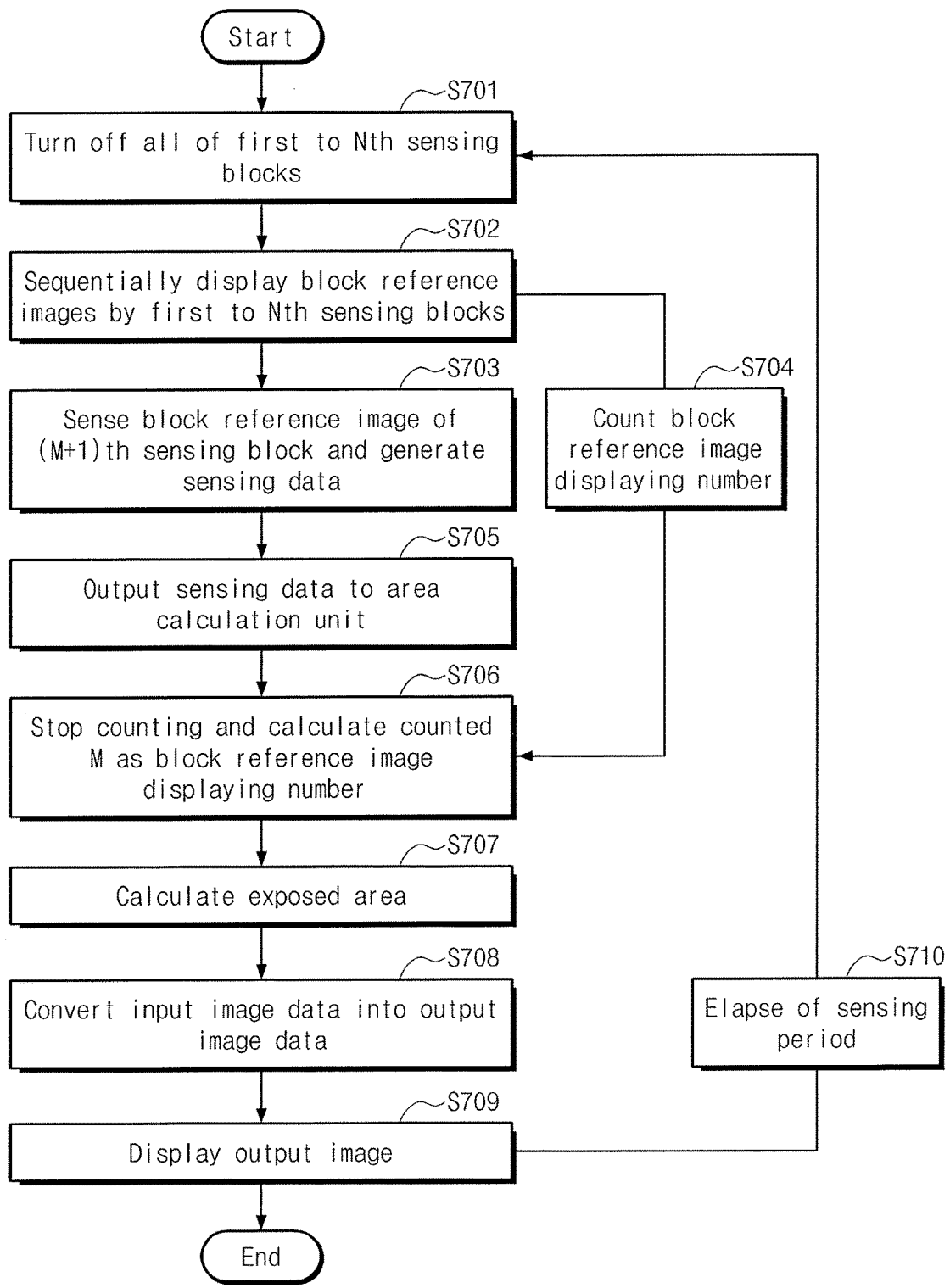
FIG. 7 illustrates an embodiment of an operation of a display device.

FIG. 7 is a flowchart illustrating another embodiment for operating a display device. Referring to FIGS. 2, 3A, and 7, all the first to Nth sensing blocks 110-1 to 110-N may be turned off with respect to the reference image of the other embodiment of the inventive concept, compared to those of FIG. 3A (S701).

Next, the first to Nth sensing blocks 110-1 to 110-N may sequentially display the block reference images (S702). For example, the second sensing block 110-2 may display the block reference image after the first sensing block 110-1 displays the block reference image, and the third sensing block 110-3 may display the block reference image after the second sensing block 110-2 displays the block reference image. The first to Nth sensing blocks 110-1 to 110-N may display the block reference images at the same interval. The area calculation unit 400 counts from 1 to M+1 in synchronization with sequential displaying of the block reference images of the first to (M+1)th sensing blocks 110-1 to 110-M+1 (S704).

When the (M+1)th sensing block 110-M+1 displays the block reference image, the light receiving sensor 300 may recognize the block reference image of the (M+1)th sensing block 110-M+1 and may generate the sensing data SD (S703).

The light receiving sensor 300 may output the sensing data SD to the area calculation unit 400 (S705). The sensing data SD may be output to the area calculation unit 400 between a time at which the (M+1)th sensing block 110-M+1 displays the block reference image and a time at which the (M+2)th sensing block 110-M+2 displays the block reference image. For example, the following inequality may be satisfied provided that the sensing data SD is output to the area calculation unit 400 at a time t5, the (M+1)th sensing block 110-M+1 displays the block reference image at a time t3, and the (M+2)th sensing block 110-M+2 displays the block reference image at a time t4.

$$t3 < t5 < t4$$

Satisfaction of the above inequality may prevent the area calculation unit 400 from miscalculating a block reference image displaying number and miscalculating a changed exposed area.

The area calculation unit 400 stops counting in response to the sensing data SD, and calculates a previously counted number M+1 as the block reference image displaying number (S706).

The area calculation unit 400 calculates the exposed area of the flexible display panel 100 on the basis of the block reference image displaying number M+1 (S707). For example, the area calculation unit 400 may calculate the exposed area as an area corresponding to the first to Mth sensing blocks 110-1 to 110-M on the basis of the number M which is smaller than the block reference image displaying number M+1 by 1. The area calculation unit 400 may output the calculated exposed area to control unit 500.

As described above, the control unit 500 may convert the input image data into the output image data on the basis of the calculated exposed area (S708), and may display a resized output image on the flexible display panel 100 (S709). The above-mentioned operations S701 to S709 may be repeated after elapse of the sensing period PT (see, e.g., FIG. 3B) (S710).

Figure 8:
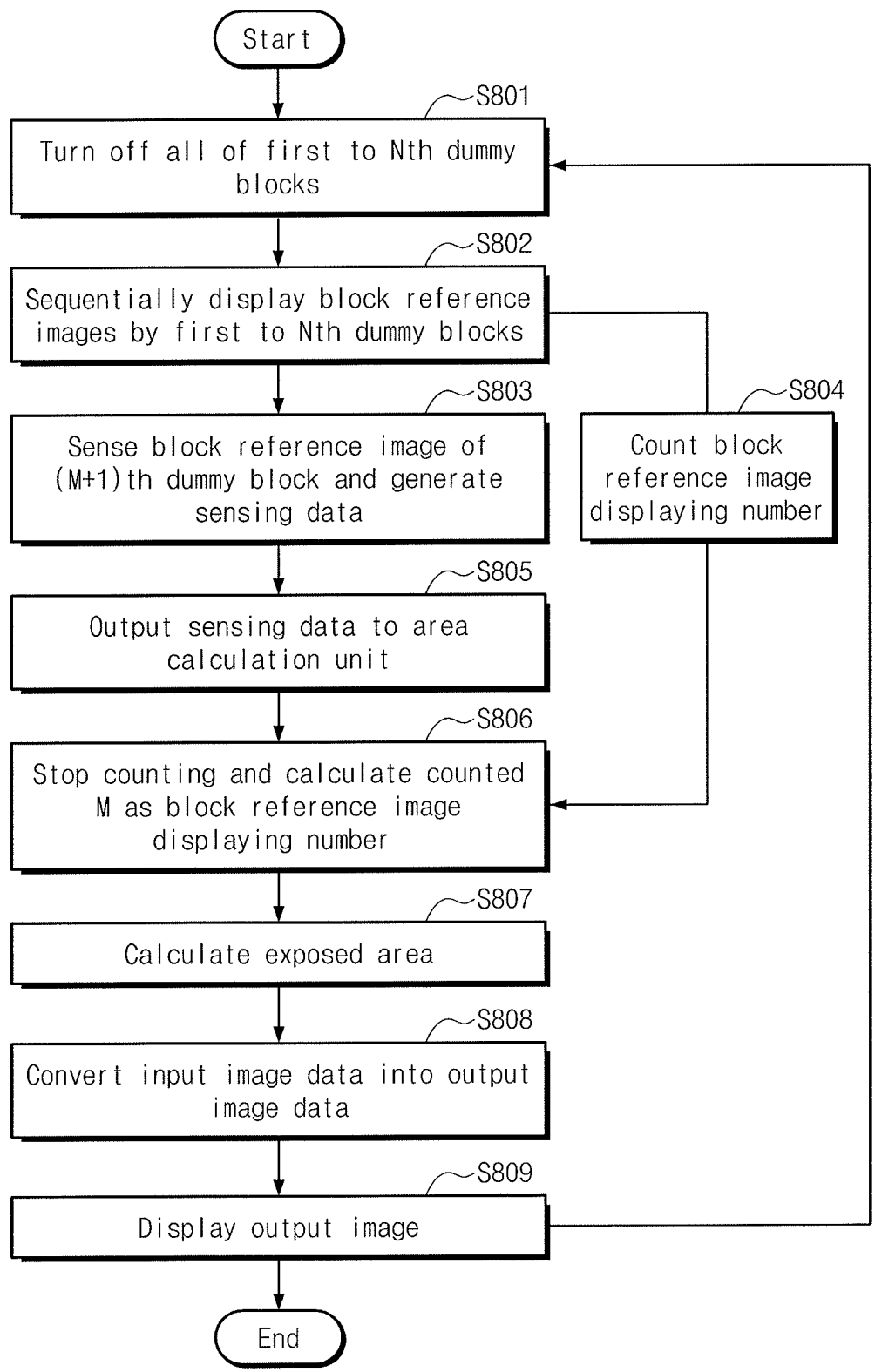
FIG. 8 illustrates another embodiment of an operation of a display device.

FIG. 8 is a flowchart illustrating another embodiment for operating a display device. Referring to FIGS. 5A, 5B, and 8, all the first to Nth dummy blocks 610-1 to 610-N may be turned off with respect to the reference image of the other embodiment of the inventive concept, compared to those of FIGS. 5A and 5B (S801).

Next, the first to Nth dummy blocks 610-1 to 610-N may sequentially display the block reference images (S802). For example, the second dummy block 610-2 may display the block reference image after the first dummy block 610-1 displays the block reference image, and the third dummy block 610-3 may display the block reference image after the second dummy block 610-2 displays the block reference image. The first to Nth dummy blocks 610-1 to 610-N may display the block reference images at the same interval. The area calculation unit 400 counts from 1 to M+1 in synchronization with sequential displaying of the block reference images of the first to (M+1)th dummy blocks 610-1 to 610-M+1 (S804).

When the (M+1)th dummy block 610-M+1 displays the block reference image, the light receiving sensor 300 may recognize the block reference image of the (M+1)th dummy block 610-M+1 and may generate the sensing data SD (S803).

The light receiving sensor 300 may output the sensing data SD to the area calculation unit 400 (S805). The sensing data SD may be output to the area calculation unit 400 between a time at which the (M+1)th dummy block 610-M+1 displays the block reference image and a time at which the (M+2)th dummy block 610-M+2 displays the block reference image. For example, the following inequality may be satisfied provided that the sensing data SD is output to the area calculation unit 400 at a time t8, the (M+1)th dummy block 610-M+1 displays the block reference image at a time t6, and the (M+2)th dummy block 610-M+2 displays the block reference image at a time t7.

$$t6 < t8 < t7$$

Satisfaction of the above inequality may prevent the area calculation unit 400 from miscalculating a block reference image displaying number and miscalculating a changed exposed area.

The area calculation unit 400 stops counting in response to the sensing data SD, and calculates a previously counted number M+1 as the block reference image displaying number (S806). The area calculation unit 400 calculates the exposed area of the flexible display panel 100' on the basis of the block reference image displaying number M+1 (S807). For example, the area calculation unit 400 may calculate the exposed area as an area corresponding to the first to Mth dummy blocks 610-1 to 610-M on the basis of the number M which is smaller than the block reference image displaying number M+1 by 1. The area calculation unit 400 may output the calculated exposed area to the control unit 500.

As described above, the control unit 500 may convert the input image data into the output image data on the basis of the calculated exposed area (S808) and may display a resized output image on the flexible display panel 100' (S609).

The above-mentioned operations S801 to S809 may be repeated without the sensing period PT described above with reference to FIG. 7. The flexible display panel 100' may redisplay the reference image immediately after the Nth dummy block 610-N displays the reference block image.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The calculation units, control units, and other processing features of the disclosed embodiments may be implemented in logic which, for example, may include hardware, software, or both. When implemented at least partially in hardware, the calculation units, control units, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the calculation units, control units, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a display device includes a light receiving sensor for sensing a reference image. Therefore, an output image may be displayed on a flexible display panel according to a changed exposed area.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A display device, comprising:
a housing;
a flexible display panel, coupled to the housing, to display a reference image and an output image, the flexible display panel having an exposed area with a size that varies with movement of the flexible display panel in a first direction;
a light receiving sensor to sense the reference image and to generate sensing data based on the reference image, the light receiving sensor being in the housing; and
an area calculator to calculate the exposed area of the flexible display panel based on the sensing data, the area calculator connected to the light receiving sensor, wherein
the flexible display panel includes a plurality of sensing blocks arranged in the first direction, and the reference image is to be displayed through the plurality of sensing blocks,
the plurality of sensing blocks include first to Nth sensing blocks sequentially arranged in a third direction opposite to the first direction,
first to Mth sensing blocks among the first to Nth sensing blocks are externally exposed from the housing and (M+1)th to Nth sensing blocks among the first to Nth sensing blocks are in the housing, wherein N≥2 and 2≤M<N and wherein the first to Nth sensing blocks are to be sequentially turned off after block reference images are simultaneously displayed by the first to Nth sensing blocks,
the light receiving sensor is in the housing and faces the (M+1)th sensing block, the light receiving sensor is to sense turning off of the (M+1)th sensing block to generate the sensing data, and
the area calculator is to:
count from 1 to M+1 in synchronization with sequential turning off of the block reference images of the first to (M+1)th sensing blocks,
stop counting in response to the sensing data and calculate a previously counted number M+1 as a turn-off number, and
calculates the exposed area based on the turn-off number.

2. The display device as claimed in claim 1, further comprising:
a controller to convert input image data to output image data based on the calculated exposed area, wherein the flexible display panel is to display the output image based on the output image data.

3. The display device as claimed in claim 2, wherein the flexible display panel is to display the output image through an exposed part.

4. The display device as claimed in claim 1, wherein the flexible display panel includes:
a plurality of gate lines extending in a second direction different from the first direction and arranged in the first direction.

5. The display device as claimed in claim 4, wherein each of the plurality of sensing blocks corresponds to a plurality of pixel rows.

6. The display device as claimed in claim 1, wherein:
the sensing data is to be output to the area calculator at an output time,
the output time satisfies t1<t0<t2, where t0 represents the output time, t1 represents a turn-off time of the (M+1)th sensing block, and t2 represents a turn-off time of the (M+2)th sensing block.

7. The display device as claimed in claim 1, wherein the flexible display panel is to display the reference image in sensing periods.

8. The display device as claimed in claim 7, wherein the sensing period corresponds to a predetermined number of frames.

9. A display device comprising:
a housing;
a flexible display panel, coupled to the housing, and is to display a reference image and an output image, the flexible display panel having an exposed area with a size that varies with movement of the flexible display panel in a first direction;
a light receiving sensor to sense the reference image and to generate sensing data based on the reference image, the light receiving sensor being in the housing; and
an area calculator to calculate the exposed area of the flexible display panel based on the sensing data, the area calculator connected to the light receiving sensor, wherein
the flexible display panel includes a first display region to display the reference image and a second display region to display the output image,
the first display region includes first to Nth dummy blocks,
the reference image is to be displayed through the first to Nth dummy blocks,
the first to Nth dummy blocks are sequentially arranged in a third direction opposite to the first direction,
the first to Mth dummy blocks among the first to Nth dummy blocks are externally exposed from the housing, and the (M+1)th to Nth dummy blocks among the first to Nth dummy blocks are in the housing, wherein N≥2 and 2≤M<N,
the reference image includes block reference images sequentially and respectively displayed by the first to Nth dummy blocks,
the light receiving sensor is in the housing and faces the (M+1)th dummy block, the light receiving sensor to sense turning on of the (M+1)th dummy block to generate the sensing data, and
the area calculator is to:
count from 1 to M in synchronization with sequential turning on of the block reference images of the first to Mth dummy blocks,
stop counting in response to the sensing data and calculate a previously counted number M as a block reference image displaying number, and
calculate the exposed area based on the block reference image displaying number.

10. The display device as claimed in claim 9, wherein:
the sensing data is output at an output time,
the output time satisfies t1<t0<t2, where t0 represents the output time, t1 represents a turn-off time of the (M+1)th dummy block, and t2 represents a turn-off time of the (M+2)th dummy block.

11. The display device as claimed in claim 9, wherein the first display region is to redisplay the reference image immediately after the Nth dummy block is turned off.

12. The display device as claimed in claim 9, wherein the first display region and the second display region are to simultaneously display the reference image and the output image.

\* \* \* \* \*